United States Patent [19]
Madrid et al.

[11] Patent Number: 5,916,325
[45] Date of Patent: Jun. 29, 1999

[54] ACTUATOR ASSEMBLY AND TORQUE LIMITING SYSTEM FOR SAME

[75] Inventors: Ronn G. Madrid, Midland; Don Hiller, Longview; Terry Cloninger, Houston, all of Tex.; Roy MacKenzie; Jim McMillan, both of Aberdeen, United Kingdom

[73] Assignee: Dresser Industries, Inc., Dallas, Tex.

[21] Appl. No.: 08/831,889

[22] Filed: Apr. 3, 1997

[51] Int. Cl.⁶ .................................................. F16H 27/02
[52] U.S. Cl. ............................... 74/89.15; 74/424.8 VA; 192/56.1; 464/37
[58] Field of Search ................... 74/89.15, 424.8 VA; 192/56.1; 464/37, 30, 160

[56] References Cited

U.S. PATENT DOCUMENTS

| | | | |
|---|---|---|---|
| 924,749 | 6/1909 | Drapier | 464/37 |
| 1,587,724 | 6/1926 | Harley | 464/160 |
| 1,953,430 | 4/1934 | Parre | 464/37 |
| 2,501,648 | 3/1950 | Ogden | 464/37 |
| 3,704,853 | 12/1972 | Waller | 74/424.8 VA |
| 3,949,626 | 4/1976 | Berlinger, Jr. et al. | 74/424.8 VA |
| 3,989,223 | 11/1976 | Burkhardt et al. | 74/424.8 VA |
| 4,273,307 | 6/1981 | Malinski et al. | |
| 4,660,428 | 4/1987 | Payne | |
| 4,691,893 | 9/1987 | Akkerman et al. | |
| 4,741,508 | 5/1988 | Fukamachi | |
| 4,920,811 | 5/1990 | Hopper | |
| 5,195,721 | 3/1993 | Akkerman | |
| 5,480,015 | 1/1996 | Yang | 192/56.1 |

*Primary Examiner*—John A. Jeffery
*Assistant Examiner*—David Fenstermacher
*Attorney, Agent, or Firm*—Haynes and Boone, LLP

[57] ABSTRACT

A torque limiting system for limiting the torque transferred between a rotating member and another member in which a disc is disposed within the rotating member and a shaft is coupled to the disc for receiving a load. At least one bearing member is disposed in the disc and is urged in a radial direction into engagement with the rotating member to normally couple the rotating member to the shaft to drive the shaft. The bearing member responds to loads on the shaft exceeding a predetermined value for releasing the engagement with the rotating member and decoupling the rotating member from the shaft.

6 Claims, 4 Drawing Sheets

ACTUATOR ASSEMBLY AND TORQUE LIMITING SYSTEM FOR SAME

BACKGROUND OF THE INVENTION

The present invention relates to an actuator assembly and, more particularly, to such an assembly which provides axial movement of a ball screw between an extended and a retracted position, and a system for limiting the amount of torque applied to the assembly.

Actuator assemblies, in which a helically grooved ball screw is mounted for reciprocal axial movement in a ball nut, are used in many environments in which axial movement of a device is desired. The ball nut is secured against axial movement and is rotated to cause corresponding axial movement of the ball screw to an extended position. Actuators are used with many devices, such as, for example, gate valves or the like, which are attached to the ball screw for axial movement therewith. The ball nut can be rotated by fluid pressure as disclosed in U.S. Pat. No. 4,691,893; by an electrical motor as disclosed in U.S. Pat. No. 5,195,721; or in any other conventional manner.

In some of these assemblies, an inner race is driven, via a reduction gearing system, by the power source and is coupled to a driver by a wrap spring which functions as a clutch. The driver is connected, by a gear and pinion, to the ball nut for rotating same. A low power activating device, such as an electrical solenoid, or switch, is usually provided which, when activated by a relatively low power signal, engages a control module that latches to the driver and therefore couples the driver to the inner race by causing the wrap spring to couple the inner race to the driver. This, in turn, causes the ball nut to rotate and the ball screw to extend from the ball nut and move to its fully extended position.

Some of these arrangements employ a system for limiting the load on, or the amount of torque applied by, the power source. More particularly, in the event the above-described gears, as well as the components associated with the gears, the ball screw, the gate valve, or any device connected to the ball screw, become jammed, or are otherwise unable to rotate properly, the load on the power source is dramatically increased. In order to avoid damage to the power source, torque limiting systems have evolved. For example, some use a ball, or roller, that extends axially into a detent, or the like, in a rotating member for coupling the power source to the gear train of the actuator. However, these arrangements are prone to rather excessive axial vibration that can cause other sensitive parts of the actuator to malfunction. Other types of torque limiting systems utilize a frictional engagement for coupling the power source to the gear train of the actuator. However, the mating parts of these devices heat up to the extent that their operation is impaired.

Therefore, what is needed is an actuator assembly and a torque limiting system for the assembly which couples the power source of the actuator to its gear train, yet decouples same in response to excessive loads being applied to the power source, while minimizing axial vibration and excessive heating of the components of the system.

SUMMARY OF THE INVENTION

Accordingly, the torque limiting system of the present invention is designed to limit the torque transferred between a rotating member and another member. The torque limiting system includes a disc disposed within the rotating member and a shaft coupled to the disc for receiving a load. At least one bearing member is disposed in the disc and is urged in a radial direction into engagement with the rotating member to normally couple the rotating member to the shaft to drive the shaft. The bearing member responds to loads on the shaft exceeding a predetermined value for releasing the engagement with the rotating member and decoupling the rotating member from the shaft.

The torque limiting system of the present invention enjoys the advantages of eliminating excessive axial vibration and heating of its component parts yet effectively couples the power source of the actuator to its gear train while decoupling same in response to excessive loads being applied to the power source. Also, the amount of load required to cause the decoupling is adjustable.

DESCRIPTION OF THE PREFERRED EMBODIMENT

Figure 1:
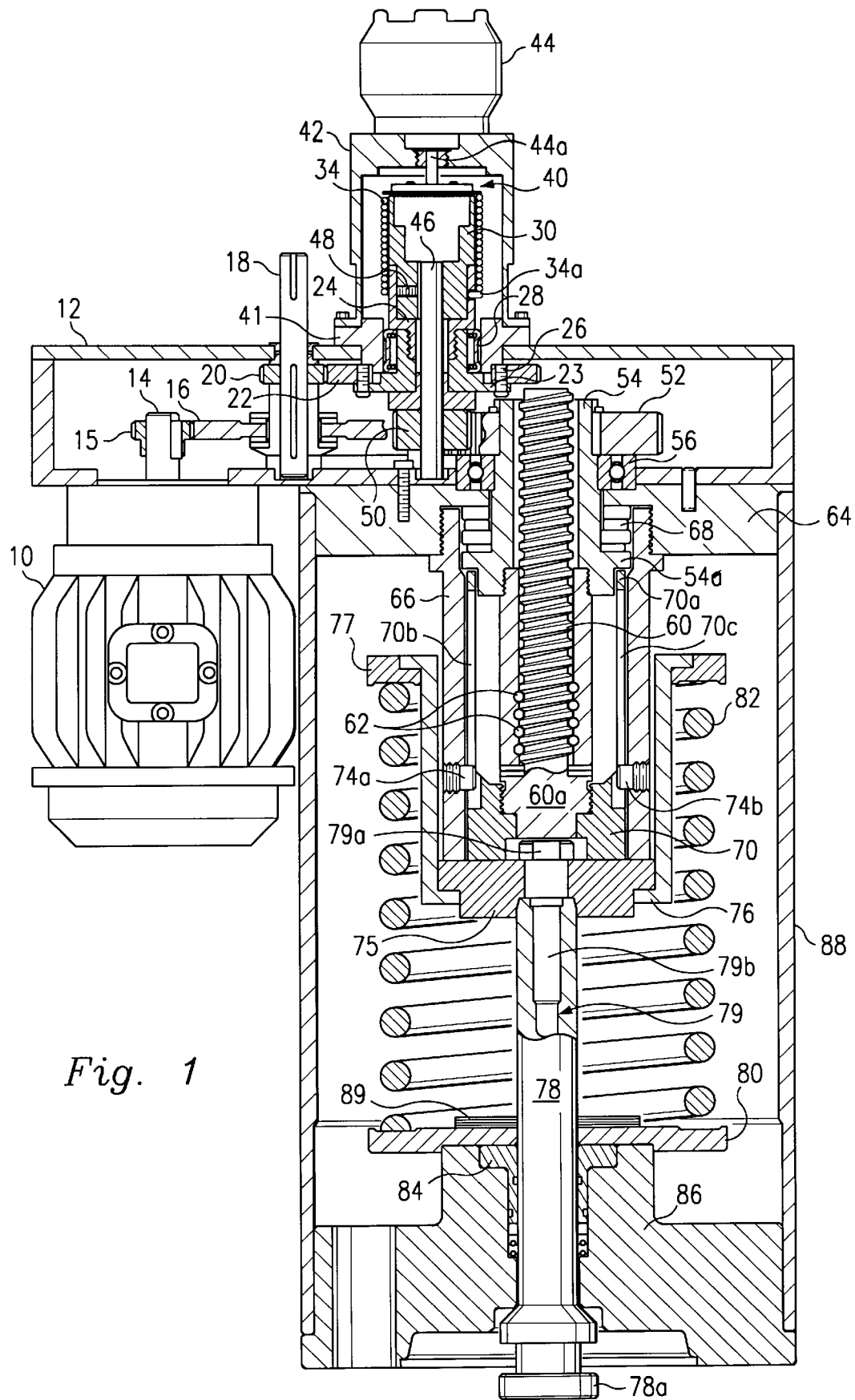
FIG. 1 is a vertical sectional view of the actuator of the present invention shown with its ball screw in a retracted position.
Figure 2:
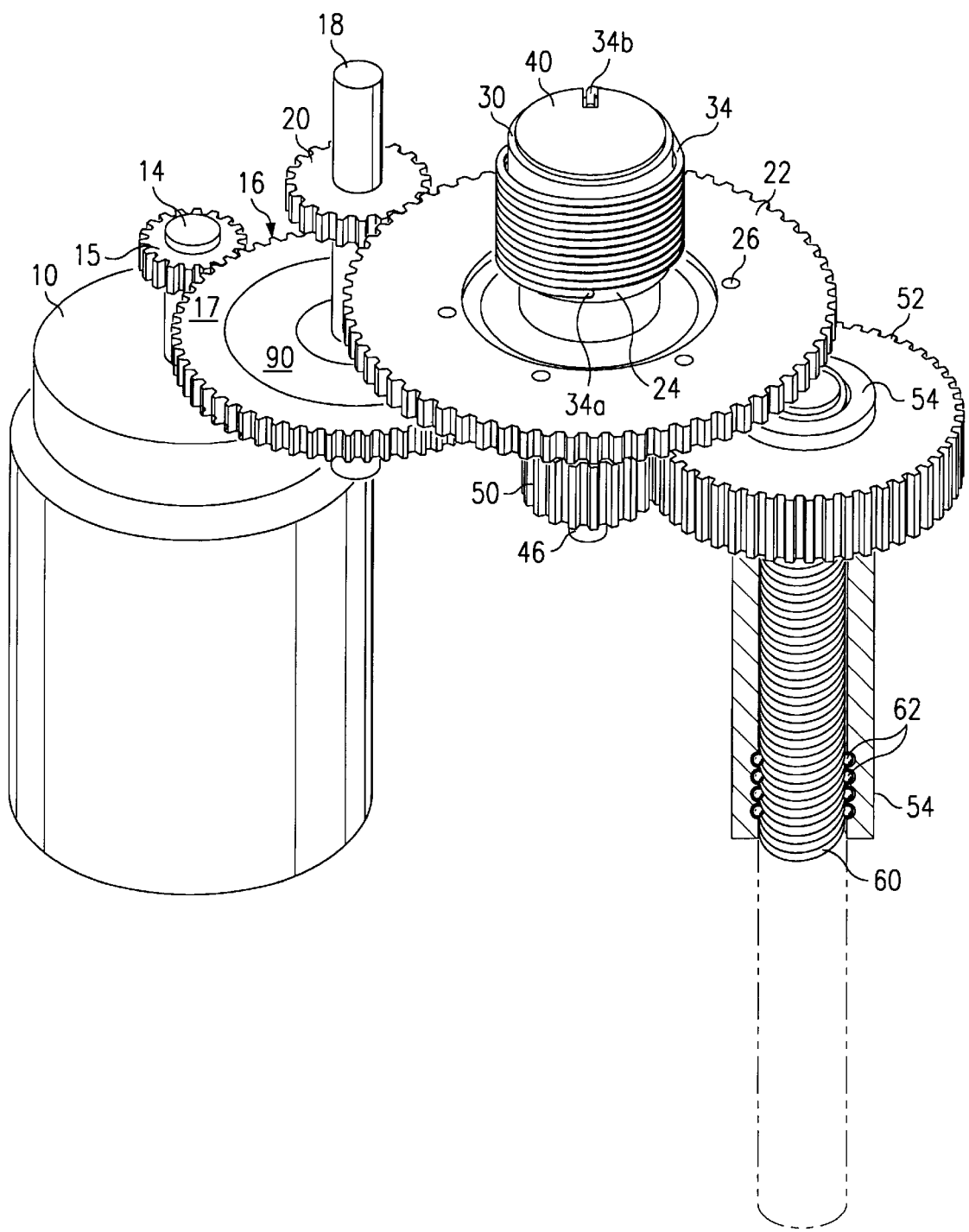
FIG. 2 is an enlarged isometric view of several components of the actuator of FIG. 1, including the torque limiting system of the present invention.

Referring to FIGS. 1 and 2 of the drawing, the torque limiting system of the present invention will be shown and described in connection with an actuator assembly which includes a power source, shown in general by the reference numeral 10. The power source 10 is, for the purpose of example, an AC motor which is connected in any known manner, such as by bolts, to the outer surface of one wall of a circular casing 12. An output shaft 14 extends from the motor 10 into the interior of the casing 12 where it is connected to a pinion gear 15, which, in turn, is connected to the torque limiting system of the present invention, which is shown in general by the reference numeral 16.

The torque limiting system 16 includes a spur gear 17 that has a central opening which receives a shaft 18 which is coupled to the gear in a conventional manner. Therefore, rotation of the output shaft 14 by the motor 10 normally causes corresponding rotation of the torque limiting system 16, including the spur gear 17, and the shaft 18. A pinion gear 20 also extends around, and is coupled to, the shaft 18 in an axially-spaced relation to the spur gear 17. Another spur gear 22 is provided which is in engagement with the pinion gear 20. Therefore, the above-mentioned rotation of the shaft 18 causes rotation of the pinion gear 20 to drive the spur gear 22. It is understood that the pinion gear 15, the torque limiting system 16 and the gears 20 and 22 are supported for rotation in the casing 12 in any conventional manner, and that the design is such that the speed of the spur gear 22 is substantially reduced from the speed of the output shaft 14 of the motor 10, in a conventional manner.

The spur gear 22 has an enlarged central opening through which a mounting flange 23 (FIG. 1) extends. An inner race 24 is threadedly connected to the mounting flange 23 and a plurality of bolts 26 extend through aligned openings in the mounting flange and the gear 22 to couple the gear to the inner race.

A portion of the inner race 24 projects upwardly, as viewed in FIGS. 1 and 2, through an opening in the casing 12 and the inner and outer surfaces of the inner race 24 are stepped. A ring-shaped sprag clutch 28 extends around the mounting flange 23 and functions to permit rotation of the mounting flange, and therefore the inner race 24, in only one direction. Therefore, the above-described, relatively low-speed rotation of the spur gear 22 causes rotation of the mounting flange 23, and therefore the inner race 24, which rotation is permitted in one, predetermined direction by the sprag clutch 28.

The upper portion of a cylindrical driver 30, as viewed in FIG. 1, extends within the upper end portion of the inner race 24. The outer surface of the driver 30 and the inner surface of the inner race 24 are stepped and complementary so that the upper portion of the inner race receives the corresponding lower surface of the driver in a slightly spaced relation. Thus, the upper portion of the inner race 24 can rotate around the overlapped lower portion of the driver 30 under conditions to be described.

A wrap spring 34 normally extends around the outer surfaces of the driver 30 and the inner race 24 in a loose fit, and functions as a clutch. To this end, a tang 34a is formed on the lower portion of the wrap spring 34 and extends into a corresponding notch formed in the outer surface of the inner race 24. A control module 40, shown generally in FIGS. 1 and 2, is disposed in the upper end portion of the driver 30. The control module is described in detail in co-pending patent application Ser. Nos. 08/819,759, filed Apr. 3, 1997, 08/819,761 filed Apr. 3, 1997; and 08/832,496 filed Apr. 3, 1997, assigned to the assignee of the present invention, the disclosures of which are incorporated by reference.

A tang 34b (FIG. 2) is formed on the upper end of the wrap spring and extends into a notch formed in a component of the control module 40. An outer race 41 extends over the mounting flange 23 and the inner race 24 and a cover 42 is mounted on the outer race and encases the control module 40, the driver 30, the wrap spring 34 and the inner race 24a.

An electrical switching device, such as a solenoid 44, is mounted to an end plate of the cover 42 and has an armature 44a that extends through an opening in the latter end plate and engages the upper portion of the control module 40. The armature 44a moves between an extended position when the solenoid is energized to actuate the control module 40 in a manner disclosed in the above-identified patent applications, and a retracted position (under the force of a spring, or the like) when the solenoid is de-energized.

The wrap spring 34, and therefore the control module 40 rotate with the inner race 24. When the armature 44a of the solenoid 44 actuates the control module 40 and the control module latches to the stationary driver 30 in the manner described in the above-identified patent applications, the upper end of the wrap spring 34 is thus restrained against movement, causing the wrap spring to tighten over the outer surfaces of the inner race 24 and the driver 30. This couples the inner race 24 to the driver 30 and thus transmits torque from the inner race to the driver in a manner to be described.

It is understood that a manually actuated locking device can be mounted between the control module 40 and the solenoid 44 as disclosed in the above-identified patent application Ser. No. 08/819,761. When actuated, this locking device functions to maintain the control module 40 in an actuated condition even after the solenoid 44 has been de-energized.

An output shaft 46 is disposed in the lower portion of the driver 30 in a coaxial relationship, extends through the inner race 24 and projects downwardly from the lower end of the inner race. A radially-extending set screw 48 extends through an opening in the driver 30 and engages the output shaft 46 to lock the shaft to the driver so that the shaft rotates with the driver.

A pinion 50 is disposed on the lower, projecting end portion of the output shaft 46 and engages a spur gear 52 which is connected to, and extends around the upper end portion of an elongated ball nut 54. The upper portion of the ball nut 54 extends in the casing 12 and the ball nut is mounted for rotation in a bearing assembly 56 located adjacent to an opening in the latter casing through which the ball nut projects. Therefore, when the rotating inner race 24 is coupled to the driver 30 by the wrap spring 34 as controlled by the armature 44a and the control module 40 in a manner to be described, the driver 30, and therefore the output shaft 46 and the pinion 50, rotate accordingly. This rotates the gear 52 causing corresponding rotation of the ball nut 54.

A helically grooved ball screw 60 is disposed in the ball nut 54 and the inner portion of the lower end portion of the ball nut 54 is provided with a helical groove that complements the groove in the ball screw 60 so as to receive a plurality of balls 62. As a result, rotation of the ball nut 54 causes corresponding axial movement of the ball screw 60 between a retracted position shown in FIG. 1 and by the solid lines in FIG. 2, and an extended position shown by the phantom lines in FIG. 2.

A head 64 is bolted to the lower portion of the casing 12 and a housing 66 is connected to, and extends downwardly from, the head and around the ball nut 54. A thrust bearing 68 extends in an area defined by a stepped portion of the head 64, the upper end portion of the housing 66, and a corresponding surface of the ball nut 54. A flange 54a extends radially outwardly from the lower portion of the ball nut 54 and engages the thrust bearing 68 in the retracted position of the ball screw, as shown.

The lower end portion 60a of the ball screw 60 is enlarged and is in threaded engagement with an adapter 70 that has a sleeve 70a extending in a radially-spaced relation to the ball nut 54 in the housing 66. Two elongated, diametrically opposed, slots 70b and 70c are provided in the sleeve 70a of the adapter 70 which respectively receive two radially extending set screws 74a and 74b extending through corresponding openings in the housing 66. As a result, rotation of the ball screw 60 with the ball nut 54 is prevented so that the ball screw will extend or retract axially relative to the ball nut when the nut is rotated.

The lower end of the adapter 70 abuts against a plate 75 that is connected to a spool sleeve 76 which, in turn, is connected to an upper spring plate 77. Central openings are formed through the adapter 70 and the plate 75 to permit a stem 78 to be connected to the lower end of the ball screw 60. To this end, a spring bolt 79 has a head portion 79a disposed in an enlarged opening in the lower end portion of the adapter 70 and a shaft portion 79b that extends through the opening in the plate 75 and into the upper end portion of the stem 78 and is connected to the stem in any known manner. The upper end of the stem 78 extends in a corresponding opening formed in the lower portion of the plate 75. As a result of this arrangement, the stem 78, the plate 75 and all components connected thereto, are separate from the ball screw 60 and the plate 70. This not only aids in manufacture and assembly, but insures that no torque from the rotating ball nut 54 will be applied to the stem 78 and any valve, or the like, connected thereto.

A lower spring plate 80 extends around the stem 78 and normally extends in a spaced relation to the plate 75, and a helical spring 82 extends between the upper spring plate 77 and the lower spring plate 80. The lower spring plate 80 is maintained in a stationary position by a packing retainer 84 that extends around the stem 78 and is secured to a bonnet 86. An outer cylindrical housing 88 extends from the head 64 to the bonnet 86, is mechanically connected to both, and encloses the lower portion of the ball nut 54 and its associated components. A plurality of shims 89 are mounted on the upper surface of the spring plate 80 and control the stroke length of the ball screw 60, as will be described.

The stem 78 reciprocates with the ball screw 60 and relative to the fixed lower spring plate 80, the packing retainer 84, and the bonnet 86. The stem 78 has an enlarged lower head portion 78a which projects from the lower surface of the bonnet 86 and which is adapted to be connected to a device (not shown), such as a gate valve, which is to be actuated by the assembly of the present invention. Thus, when the ball nut 54 is rotated and the ball screw 60 moves downwardly to its extended position shown by the phantom lines in FIG. 2, it causes corresponding downward movement of the adapter 70, the plate 75, the spool sleeve 76, the upper spring plate 77 and the stem 78. The spring 82 is thus compressed between the upper spring plate 77 and the fixed lower spring plate 80 and is adapted to assist in returning the ball screw 60 back to its retracted position in a manner to be described.

Figure 3:
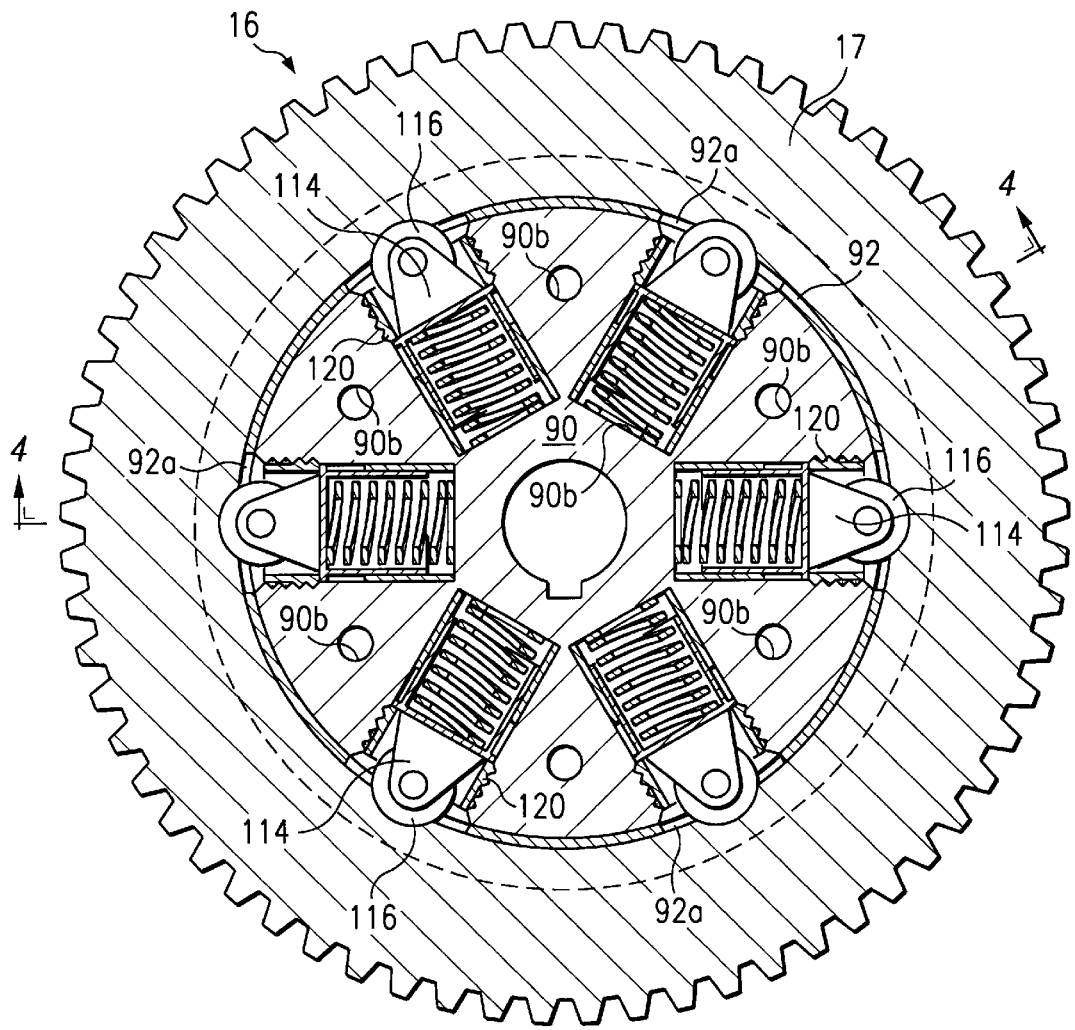
FIG. 3 is a horizontal sectional view of the torque limiting system of the present invention.
Figure 4:
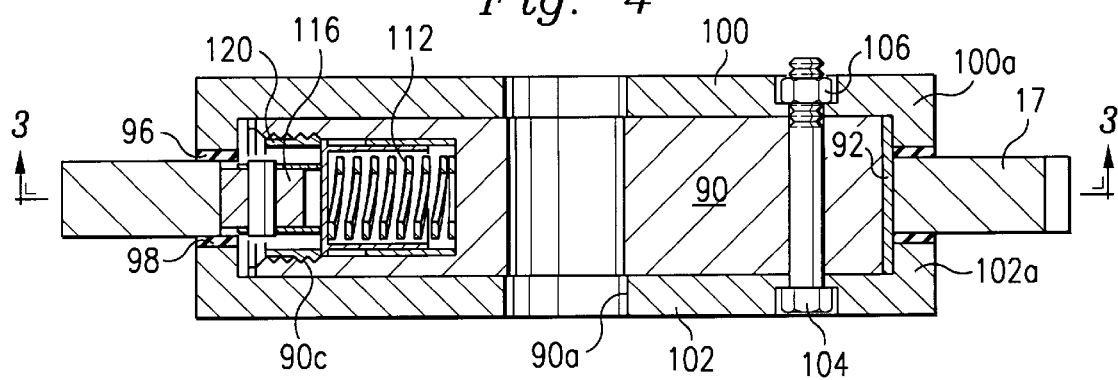
FIG. 4 is a cross-sectional view taken along the line 4—4 of FIG. 3.
Figure 5:
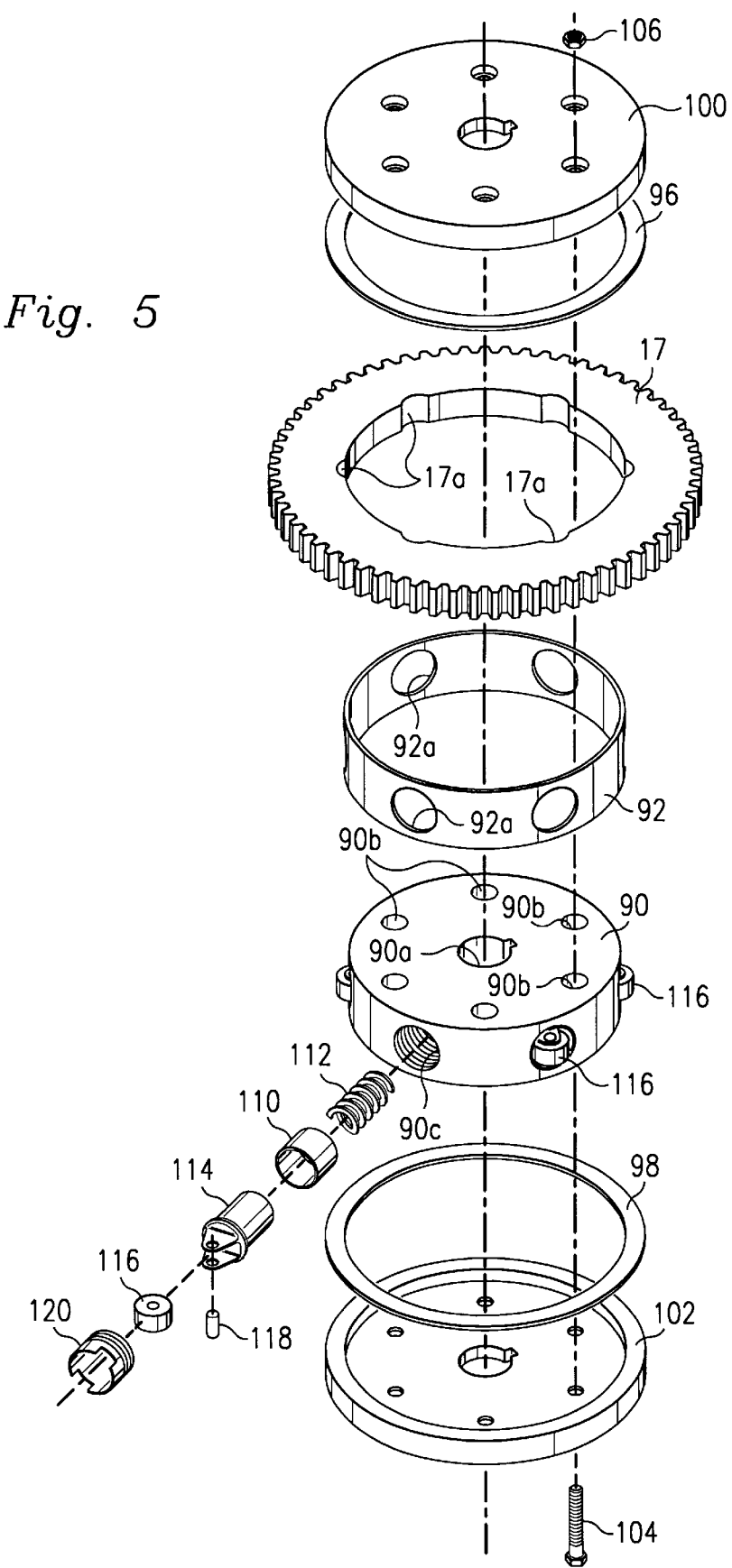
FIG. 5 is an exploded isometric view of the torque limiting system of FIGS. 3 and 4.

Details of the torque limiting system 16 are shown in FIGS. 3–5. The system 16 includes a solid disc-like body member 90 having a central opening 90a extending therethrough which receives the shaft 18 (FIG. 2) and is locked thereto in any conventional manner. Six parallel, spaced holes 90b extend through the body member 90 and parallel to its axis, and six radially-extending threaded bores 90c are also formed in the body member 90 and are angularly spaced at thirty degree intervals. The purposes of the openings 90b and the bores 90c will be described in detail later.

A sleeve 92 extends around the outer circumference of the body member, with the height of the sleeve corresponding to the thickness of the body member. A plurality of openings 92a extend through the sleeve 90 and register with the radial bores 90c of the body member 90. It is understood that the sleeve 92 is attached to the body member 90 in any known manner, such as, for example, by a plurality of pins, or the like, extending through the sleeve and into the body member.

The body member 90 and the sleeve 92 are disposed in a central opening formed in the spur gear 17 with the sleeve 92 extending between the outer circumference of the body member and the inner surface of the gear 17 defining its central opening in a tight frictional fit. The gear 17 engages the pinion gear 15 (FIG. 2) and is driven by the pinion gear under conditions to be described. As better shown in FIG. 5, the gear 17 has six semi-circular detents 17a angularly spaced around the inner wall defining its central opening. A pair of rings 96 and 98 respectively extend over the upper and lower surfaces of the gear 17, as viewed in FIGS. 4 and 5.

An upper cover plate 100 and a lower cover plate 102 respectively extend over the upper and lower surfaces of the body member 90. The plates 100 and 102 are provided with annular flanges, or lips 100a and 102a, respectively which engage the rings 96 and 98, respectively. Six bolts 104 (one of which is shown in FIGS. 4 and 5) extend through the openings 90b in the body member 90 and through corresponding aligned openings in the plates 100 and 102, and are respectively engaged by six nuts 106 (one of which is shown) to secure the above components of the system 16 in their assembled condition shown in FIG. 4.

As better shown in FIGS. 3 and 5, six roller bearing assemblies are respectively disposed in the radial bores 90c in the body member 90. Each assembly includes a bearing sleeve 110 which receives a spring 112. A clevis 114 has a cylindrical body that extends within its corresponding bearing sleeve 110 and around the corresponding spring 112. A roller bearing 116 is rotatably mounted to each clevis by a pin 118 that extends though aligned openings in the clevis. A set screw 120 is in threaded engagement with the wall portion of the body member 90 defining each radial bore 90c. Therefore, axial adjustment of each set screw 120 in its respective bore 90c also adjusts the axial location of its corresponding clevis 114 and varies the load applied to the clevis and to the corresponding roller bearing 116 by the corresponding spring 112.

As better shown in FIG. 3, the roller bearings 116 are urged outwardly from the openings 90a in the body member 90 by the springs 112, respectively and into engagement with the inner wall of the gear 17. Upon rotation of the shaft 14 (FIGS. 1 and 2), and therefore the pinion gear 15, the gear 17 rotates until the roller bearings 116 align with, and are forced into, the respective detents 17a by the springs 112, respectively. This couples the body member 90, and therefore the shaft 18, to the gear 17 and thus transmits the torque from the motor 10, through the gear 17 and the body member 90, to the shaft 18 to rotate it and the pinion gear 20 for reasons to be described.

In operation of the actuator assembly of the present invention, it will be assumed that the assembly is oriented as shown in FIGS. 1 and 2, i.e., so that the ball screw 60 moves downwardly towards its extended position, and upwardly to its retracted position. It will also be assumed that the armature 44a of the solenoid is in its de-energized, retracted position of FIG. 3; and the ball screw 60 is initially in its fully retracted position.

The solenoid 44 is initially actuated causing its armature 44a to push the plunger (not shown) of the control module 40 downwardly against the force of the spring 104. This downward movement of the plunger of the control module latches the control module 40 to the driver 30 in the manner disclosed in the above-identified patent applications and permits the wrap spring 34 to couple the inner race 24 to the driver 30 as will be described.

The motor 10 is then turned on which drives its output shaft 14, and therefore the gear 17 of the torque limiting system 16. As the gear rotates, the roller bearings 116 are forced into engagement with the detents 17a of the gear 17 which couples the body member 90, and therefore the shaft 18, to the gear 17. As a result, the shaft 18 and the pinion 20 rotate with the output shaft 14. The pinion 20, in turn, drives the gear 22 and therefore the inner race 24, with the above-described gears and pinions reducing the rotational speed of the inner race when compared to that of the output shaft 14 of the motor 10. Since the tangs 34a and 34b of the wrap spring 34 are respectively connected to the inner race 24 and to the control module 40, this rotation of the inner race 24 causes rotation of the wrap spring 34 and therefore the control module 40. Since the control module 40 is latched to the driver 30, this initial rotation of the control module 40 causes the wrap spring 34 to immediately tighten over the driver 30 and couples the inner race 24 to the driver in the manner described above. Therefore, the driver 30 and the shaft 46 also rotate at the same reduced speed.

The rotation of the shaft 46 causes corresponding rotation of the pinion 50, the gear 52, and the ball nut 54, causing the ball screw 60 to move axially from its retracted position to its extended, operative position. The plate 75 and the stem 78 also move with the ball screw 60 to its extended position until the plate 75 (FIG. 1) engages the shims 89 on the fixed lower spring plate 80, and the spring 82 is compressed accordingly. If a gate valve, or other device, is connected to the stem 78, the gate valve would be in its actuated position, which could be either opened or closed, depending on the particular design of the system.

In the fully extended, operative, position of the ball screw 60, the motor 10 is turned off by a position sensor, a timer, or the like. The ball screw 60 is maintained in the latter position by the extended armature 44a of the solenoid 44 maintaining the plunger of control module 40 in its lower position which, in turn, maintains the connection between the inner race 24 and the driver 30. The sprag clutch 28 prevents back rotation of inner race 24, and therefore the gears 22, 20, and 16 as well as the torque limiting system 16, under the force of the compressed spring 82 and any other external forces acting on the ball screw 60.

In the event it is desired to move the ball screw 60 and the stem 78 back to their retracted positions, or in the event of a power failure, the solenoid 44 is de-energized. This causes the armature 44a to retract and, as a result, the plunger (not shown) of the control module 40 is thus urged upwardly to its upper position. This permits the control module 40 to disengage from the driver 30 and unlatch the control module from the driver as discussed in detail in the above-identified patent applications. As a result, the wrap spring 34 is loosened and thus releases the coupling between the inner race 24 and the driver 30. The forces exerted by the compressed spring 82 on the upper spring plate 77, and therefore the plate 75, as well as any external forces, such as valve body pressure, or the like, acting on the stem 78, forces the ball screw 60 upwardly towards its retracted position.

Since the driver 30 is decoupled from the inner race 24, this upward movement of the ball nut 54 causes rotation of the gear 52, the pinion 50, the output shaft 46 and the driver 30 in a direction that is opposite to the direction of rotation discussed above in connection with the extension of the ball screw 60. It is understood that a dampening system can be provided which is operatively connected to the gear 52 for dampening the rotation of the latter gear and, therefore, the movement of the ball screw 60 under the force of the spring 82, and any other forces acting on the ball screw 60, from its extended position to its retracted position. The dampening system is not shown in the drawings since it is fully disclosed in the above-identified patent application Ser. No. 08/832,496.

This retracting movement of the ball screw 60 continues until the ball screw reaches the fully retracted position, with the sprag clutch 28 preventing back rotation of the remaining gear train, as discussed above. Thus, the stem 78, as well as any device connected to the stem, would also be moved back to its original position.

The torque limiting system 16 of the present invention not only transmits the torque from the output shaft 14 of the motor 10 to the shaft 18 and therefore the pinion gear 20 and the gear 22, during the movement of the ball screw 60 to its extended position as described above, but it also functions to limit the load on, or the amount of torque required by, the motor 10. More particularly, in the event the above-described gears, the components associated with the gears, the ball screw, the gate valve, or any device connected to the ball screw, become jammed, or are otherwise unable to rotate properly, the load on the motor 10, as transmitted through the torque limiting system 16, is dramatically increased. When this occurs, the gear 22, and therefore the pinion gear 20 and the shaft 18 are prevented from rotating, or rotate at a very slow speed. However, the gear 17, which is driven by the motor 10, continues rotation at its normal speed as dictated by the speed of the motor 10. When the load applied by the springs 112 to their respective roller bearings 116, as determined by the position of their corresponding set screws 120, is exceeded, the roller bearings 116 are forced out of their respective detents 17a, therefore decoupling the gear 17 from the body member 90. As a result, the gear 17, and therefore the output shaft 14, can rotate relative to the body member 90 thus enabling the motor 10 to continue to rotate at its normal speed without the danger of being damaged.

As discussed above, a locking device (not shown) can be mounted between the solenoid 44 and the control module 40 for the purpose of locking and maintaining the ball screw 60 in its fully extended position, or in any position between its fully retracted and fully extended position, even if the solenoid 44 is de-energized.

The torque limiting system 16 and the actuator assembly of the present invention enjoy the advantages of effectively coupling the power source of the actuator to its gear train while decoupling same in response to excessive loads being applied to the power source. Also, the amount of load required to cause the decoupling is adjustable by varying the axial position of the set screws 120 in their respective bores 90c. All of this is achieved while eliminating excessive axial vibration due to the radial disposition of the roller bearings 116 and the equiangular spacing of same around the axis of the body member 90. Also, heating of its component parts of the system 16 is minimized due to the elimination of any excess frictional engagement of any of its components.

Further, the control module 40 of the actuator assembly controls the large forces required to retract or extend the ball screw 60 with a device that latches the system in response to a holding signal that consumes a relatively low amount of power for a relatively long time. Also, minimal gearing is provided between the control module 40 and the ball nut 54 to reduce the possibility of multiple gears becoming jammed if a malfunction occurs. Further, the sprag clutch 28 prevents backward rotation of the gears 16, 20 and 22, as well as the gear 17 of the torque limiting system, when the ball screw 60 is in its extended position, after the motor 10 has been turned off, and before the solenoid 44 has be de-energized. Also, the stem 78, the plate 75 and all components connected thereto, are separate from the ball screw 60 and the plate 70 which not only aids in manufacture and assembly, but insures that no torque from the rotating ball nut 54 will be applied to the stem 78 and any valve, or the like, connected thereto.

It is understood that other components, such as a mechanical override and a mechanical dampener can be provided with the assembly of the present invention, but have not been shown or described in detail for the convenience of presentation.

It is also understood that variations may be made in the foregoing without departing from the scope of the present invention. For example, the torque limiting system of the present invention is not limited to use with the actuator assembly disclosed above, or with any actuator assembly. Also, the AC motor 10 can be replaced by any alternative power source including, but not limited to, a DC motor, a hydraulic or pneumatic unit, or the like; and the solenoid can be replaced by any other type of electrical switching unit or a mechanical actuator. Also, the number of detents 17a, roller bearings 116, and associated components of the torque limiting system 16 can be varied within the scope of the invention.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An actuator assembly comprising a nut member; a ball screw in threaded engagement with the nut member and movable axially relative to the nut member upon rotation of the nut member between a retracted position and an extended position; a member for producing torque; a torque limiting system adapted to be operatively connected between the torque-producing member and the nut member for transferring the torque therebetween to rotate the nut member and move the ball screw to one of the positions; the torque limiting system comprising a gear coupled to the torque-producing member and having a central opening, a disc disposed in the central opening, a shaft connected to the disc for rotating therewith and adapted to be operatively connected to the nut member for rotating same and driving the ball screw, at least one bearing member disposed in the disc, and a member urging the at least one bearing member in a radial direction into engagement with the gear to normally couple the disc to the gear so that the torque-producing member is coupled to the shaft for driving same, the at least one bearing member responding to loads on the shaft exceeding a predetermined value for releasing the engagement to decouple the torque-producing member from the shaft.

2. The actuator assembly of claim 1 wherein the gear defines an inner wall surrounding the central opening and wherein there are a plurality of angularly-spaced bearing members disposed in the disc for respectively engaging the inner wall.

3. The actuator assembly of claim 2 wherein a plurality of detents are formed on the inner wall which respectively receive the bearings members to couple the disc to the gear.

4. The actuator assembly of claim 1 further comprising at least one clevis disposed in a radially extending opening in the disc and wherein the urging member is in the form of a spring normally urging the at least one clevis outwardly, and wherein the at least one bearing member is rotatably mounted on the at least one clevis.

5. The actuator assembly of claim 4 wherein the load applied by the spring to the at least one clevis is adjustable.

6. The actuator assembly of claim 5 further comprising a nut extending in the bore and in threaded engagement with that portion of the disc defining the bore, whereby axial movement of the latter nut in the bore adjusts the load applied by the spring to the at least one clevis.

* * * * *